June 20, 1961 C. P. ROHMANN 2,989,076
ROLLER ACTUATED VALVE
Filed Aug. 30, 1957

¢ FOR OVERLAP
¢ FOR ZERO OVERLAP
¢ FOR UNDERLAP

INVENTOR.
CHARLES P. ROHMANN
BY Arthur H. Swanson
ATTORNEY.

United States Patent Office 2,989,076
Patented June 20, 1961

2,989,076
ROLLER ACTUATED VALVE
Charles P. Rohmann, Hatboro, Pa., assignor to Minneapolis-Honeywell Regulator Company, Minneapolis, Minn., a corporation of Delaware
Filed Aug. 30, 1957, Ser. No. 681,340
16 Claims. (Cl. 137—620)

This invention relates to a valve for controlling fluid flow and more particularly to a pneumatic valve.

The main object of the present invention is the provision of a new and improved valve which is inexpensive to produce and relatively easy to maintain in good order.

Another object of the present invention is the provision of a new and improved pneumatic valve having inlet and outlet channels connected by a deformable chamber, the flow of a fluid such as gas through said valve being controlled by the degree and area of deformation of the chamber connecting the input and output of said valve.

A more specific object of the invention is to provide a roller-actuated diaphragm valve which will be mechanically or manually adjusted so as to provide a predetermined amount of overlap or underlap. In other words, it is an object of the present invention to provide a roller which when placed in one position in rolling contact with the surface of a diaphragm will enable the roller to be moved a predetermined distance in either direction from that position and still keep the valve in a closed position and/or when placed in another position on the diaphragm and moved a predetermined distance in either direction from this latter position will still keep the valve in an open position.

Figure 1:
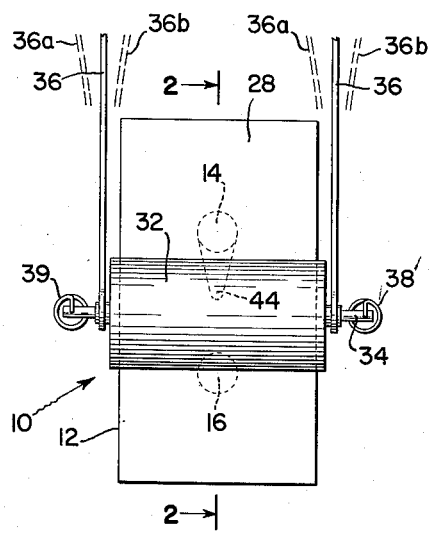
FIG. 1 is a front elevational view of a pneumatic valve embodying the present invention.
Figure 2:
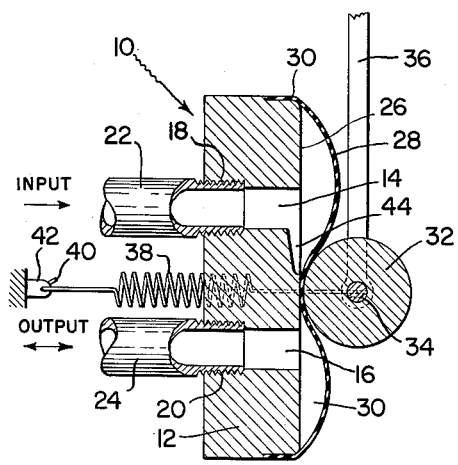
FIG. 2 is a sectional view taken along the line 2—2 of FIG. 1.

Referring now to the drawing in detail and particularly to FIGS. 1 and 2 thereof, the pneumatic valve embodying the present invention is generally designated by the reference numeral 10. Valve 10 comprises a valve body 12 which is made of suitable material such as metal. As shown herein, valve body 12 is a plate-like member, in rectangular form, and is provided with an input passage 14 and an output passage 16 which extend through body 12 and which are spaced from one another. The peripheral walls defining passages 14 and 16 may be threaded as at 18 and 20, respectively, to threadedly receive an input supply line 22 and an output supply line 24, respectively. Overlying at least that portion of the front surface 26 of valve body 12 embracing the ends of the passages 14 and 16 is a resilient or elastic diaphragm 28 which may be made of any suitable material such as rubber, rubberized fabric or any of a number of flexible plastic materials. As shown herein and as is presently preferred, diaphragm 28 is connected along its peripheral edge 30 to the peripheral edge of front surface 26 whereby to define between the front surface 26 and the diaphragm 28 a deformable chamber 30 through which fluid passes from the input passage 14 to the output passage 16.

In movable engagement with the diaphragm 28 is a movable member here shown as a roller 32. Roller 32 is rotatably mounted on an axle 34 carried by two vertically extending members 36. Preferably, roller 32 extends all the way across diaphragm 28. Members 36 may be manually or mechanically moved to change the position of roller 32 relative to valve body 12. The initial position of these roller supporting members 36, 36 may also be changed from the solid line position shown for these members in FIG. 1 in which a straight up or down manual or mechanical motion can be transmitted thereto, to a 2nd or short dash line position as is indicated by the reference numerals 36a, 36a, or to a 3rd or long dash line position as is indicated by the reference numerals 36b, 36b in which latter two mentioned positions motion other than that in an up and down direction can be transmitted thereto which will hereinafter be described in more detail under the description of FIG. 3. Means are provided for biasing the roller 32 toward valve body 12. As shown herein, that biasing means includes tension springs 38, 39 each having one end 40 fixedly attached to a stationary member 42 and having its other end connected to an end of the axle 34. Spring 38 supplies sufficient force to cause the roller 32 to deform diaphragm 28 so as to bring it into sealed relation with the front surface 26 of valve body 12.

With the construction described above, the flow of gas from passage 14 to passage 16 may be controlled by controlling the position of roller 32 relative to the valve body. For instance, with the roller 32 in the solid line position shown in FIGS. 1 and 2, there will be a seal extending all the way across the valve body, which seal will prevent any flow of gas from passage 14 to passage 16. However, when the roller 32 is moved downwardly so that its line of contact passes the uppermost portion of the passage 16, then a small amount of gas is free to flow from the passage 14 to the passage 16. The opening may be increased by moving the roller 32 downward still further. Similar control may be effected by moving the roller 32 upward into overlying relation with a portion of the input passage 14. With regard to controlling the flow of gas by causing the roller 32 to overlie a portion of input passage 14, passage 14 is preferably provided with a tapered portion 44 extending in the direction toward passage 16. This tapered portion is provided to yield closer control of the flow of gas out of the input passage 14 and to the output passage 16 and is also provided to prevent a gas surge which might result from too sharp cutoff of the flow of gas through the valve.

Figure 3:
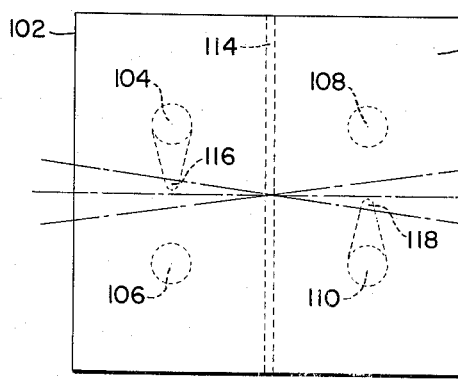
FIG. 3 is a view similar to FIG. 1 with certain parts deleted to more clearly illustrate features of a modified form of the present invention.

Referring now to FIG. 3, a modified form of valve means 100 is shown. The valve means 100 includes a valve body 102 which is substantially rectangular in configuration and is provided with four passages 104, 106, 108 and 110. Overlying the front surface of the valve body 102 is a diaphragm 112 which is connected to the edge of the front surface of valve body 102 in sealed relation therewith. The manner of sealing the diaphragm to the valve body may be any suitable means such as, for instance, cement or glue. In the valve 100 the input passage 104 is associated with the output passage 106 whereas the input passage 108 is associated with the output passage 110. Dividing the valve into sets of associated passages is a flexible partition 114 which is connected to the front surface of valve body 102 in sealing relation therewith and is also connected to the diaphragm 112 in sealing relation therewith, whereby to provide two separate deformable chambers for the passage of gas therethrough. The means for controlling the flow of a fluid such as gas or compressed air through the valve 100 may be identical to the roller 32 described with regard to FIGS. 1 and 2. It is clear that there is a definite relationship between the flow of gases through each of the separate pairs of passages. For instances, with the roller means overlying a portion of the tapered end 116 of input passage 104, there will be a slight flow of gas or compressed air between passages 104 and 106. However, with the roller means in this position there will be no flow between the passages 108 and 110. With the roller means engaging the diaphragm in a line extending between the associated passages there will be no flow through the valve. With the roller means engaging the diaphragm in a line extending over the tapered portion 118 of passage 110, there will be a slight flow between passages 108 and 110 and no flow between passages 104 and 106. Various other combinations of flows can be achieved in a valve of the type designated by the reference numeral 100.

The position indicated by the horizontal center line shown in FIG. 3 of the drawing indicates the position that the center line of the roller will be in when the roller is in a zero overlap position or in other words in a position in which the passageway between the passages 104 and 106 and the passageway between the passages 108 and 110 are closed.

Also illustrated in FIG. 3 is a second position to which the longitudinal center line of the roller may be rotatably moved. This second position is indicated by a center line that is at an acute angle to the right end portion of the aforementioned horizontal center line. This second longitudinal center line position of the roller indicates the position that the center line of the roller will be in when a predetermined overlap or dead spot is acquired. In other words this second center line position of the roller represents a position from which a predetermined roller travel can take place without opening either of the aforementioned passageways between 104 and 106 and between 108 and 110.

Finally, there is shown in FIG. 3 a third position to which the longitudinal center line of the roller may be rotatably moved. This third position is indicated by a center line that is at an obtuse angle from the right end portion of the aforementioned horizontal center line. This third longitudinal center line of the roller indicates the position that the center line of the roller will be in when a predetermined underlap is acquired. In other words this third center line position represents a position from which a predetermined roller travel can take place and still permit a predetermined flow to take place without closing either of the aforementioned passageways between 104 and 106 and between 108 and 110.

From the aforementioned description it can be seen that since the roller in diaphragm type of valve disclosed in this application can be rotated from zero overlap position to either an overlap or underlap position, the use of such a valve arrangement will readily permit the operator of such a valve to procure the desired amount of overlap or underlap control action he desires. In a similar manner to that described it can also be seen that if the roller supporting members 36, 36 shown in FIG. 1 are repositioned to the position represented by reference numerals 36a, 36a then the valve will be placed in an overlap position or if repositioned in its 36b, 36b position it will be placed in its underlap position.

Figure 4:
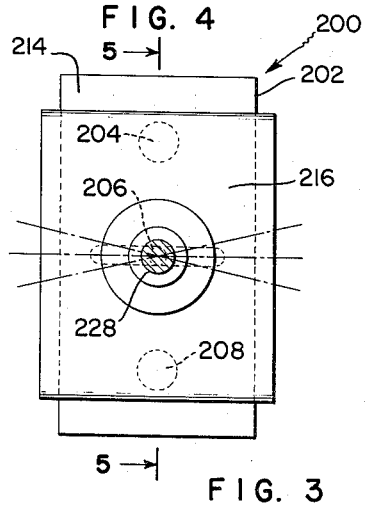
FIG. 4 is a view similar to FIG. 1 illustrating another modification of the present invention.
Figure 5:
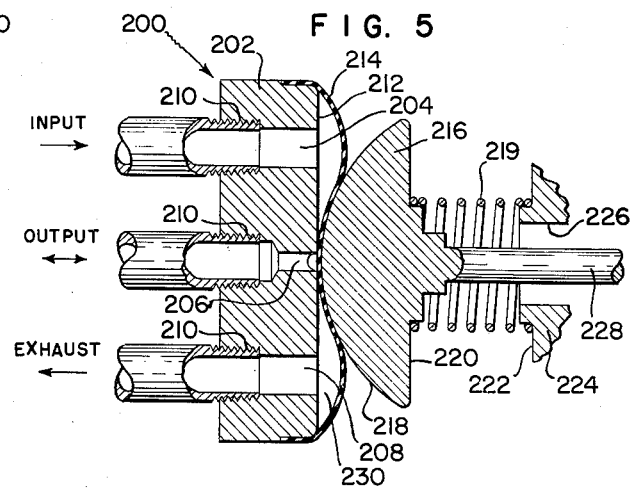
FIG. 5 is a sectional view taken along the line 5—5 of FIG. 4.

Referrng now to FIGS. 4 and 5, another modification of the present invention is illustrated. The modified form of valve shown in FIGS. 4 and 5 is designated by the reference numeral 200. Valve 200 comprises a valve body 202 having an input passage 204, an output passage 206 and an exhaust passage or vent 208. Each of the passages 204, 206 and 208 may have threaded portions as at 210 for connection to suitable pipes or tubes. Overlying the front surface 212 of valve body 202 is a deformable diaphragm 214 which is connected to the valve body preferably along the peripheral edge thereof as by glue or other suitable means. For deforming the diaphragm 214, a member 216 having a semi cylindrical surface portion 218 is provided. Member 216 is biased toward valve body 202 as by a compression spring 219 which bears against a plane surface 220 of member 216 and bears against a surface 222 of a fixed member 224 having a relatively large opening 226 therein. Fixed to member 216 and extending through the opening 226 in fixed member 224 is a rod 228 the free end of which may be moved either manually or mechanically in an upward or downward direction. It should also be noted that by rotating the rod 228 slightly in a clockwise or counterclockwise position the horizontal center line of the roller as is shown in FIG. 4 may be initially positioned to provide certain predetermined amounts of valve overlap and underlap as the member 216 is rotated from either of these positions toward or away from the input and the exhaust passageways 204 and 208.

Control of the flow of the gas or air through the valve is effected by manipulating rod 228 to shift the position of member 216 and thus shift the position of the area of contact between the valve diaphragm 214 and the front surface 212 of valve body 202. For instance, by moving member 228 upwardly, member 216 will cause diaphragm 214 to cut off the fluid flowing from input passage 204. By slightly shifting the position of the member 216 by rolling it still further upward, some gas or air will be permitted into the deformable chamber 230 from the output passageway 206, which gas will pass out of the valve through the exhaust passage 208. If it is desired that none of the gas from the outlet 206 be allowed to escape to the deformable chamber 230, or in other words vented to atmosphere through the exhaust passage 208, then the rod 228 may be moved downwardly so as to cause the diaphragm roller member 216 to cut off the exhaust passage 208. With the member 216 in this position, all of the air or gas entering the input passage 204 will pass out of the output passage 206. It is to be noted that the termination of output passage 206 in the front surface 212 of valve body 202 is not circular as are pasasges 204 and 208, but instead is elongated. By providing an elongated termination of passage 206 at the front surface 212 and by manipulating member 228 to thereby shift member 216 by rolling it, the deformable chamber 230 can be arranged to provide a large output passageway for minute degrees of roller motion.

It will be understood that in lieu of the roller 32 in FIGS. 1 and 2, a member similar to member 216 having a semi curved surface 218 of a cylindrical configuration may be employed to control the flow of gas through the valve 10. Moreover, in lieu of the member 216 in FIGS. 4 and 5, a roller 32 may be employed for controlling the flow of gas through the valve 200.

The present invention thus provides a unique roller actuated diaphragm valve whose roller may be repositioned to provide the operator of same with a predetermined overlap and/or underlap.

What is claimed is:

1. Valve means for controlling fluid flow, comprising a valve body having a single flat front surface, said valve body being provided with an input and an output passage both extending to said front surface, a resilient diaphragm overlying a portion of said front surface including the portions thereof at which said input and output passages terminate and the front surface portion therebetween, said diaphragm being connected to said valve body along the periphery of said diaphragm in fluid tight relation, and an angularly displaceable movable means for movably engaging said diaphragm and pressing an area of said diaphragm into engagement with said front surface along different angular paths to alter the magnitude of a flow of fluid passing from said input passage to said output passage.

2. Valve means for controlling fluid flow, comprising a valve body having a single flat front surface, said valve body being provided with an input and an output passage both extending to said front surface, a resilient diaphragm overlying a portion of said front surface including the portions thereof at which said input and output passages terminate and the front surface portion therebetween, said diaphragm being connected to said valve body along the periphery of said diaphragm in fluid tight relation, angularly displaceable movable means movably engaging said diaphragm, and means for biasing said valve body and movable means toward one another to press an area of said diaphragm into engagement with said front surface along different angular paths to alter the magnitude of a flow of fluid passing from said input passage to said output passage.

3. Valve means for controlling fluid flow, comprising a valve body having a single flat front surface, said valve body being provided with an input and an output passage both extending to said front surface, a resilient diaphragm overlying a portion of said front surface including the portions thereof at which said input and output passages terminate and the front surface portion therebetween, said diaphragm being connected to said valve body along the periphery of said diaphragm in fluid tight relation, and an angularly displaceable roller means movably engaging an area of said diaphragm and pressing said diaphragm into engagement with said front surface along different angular paths to alter the magnitude of a flow of fluid passing from said input passage to said output passage.

4. Valve means for controlling fluid flow, comprising a valve body having a single flat front surface, said valve body being provided with an input and an output passage both extending to said front surface, a resilient diaphragm overlying a portion of said front surface including the portions thereof at which said input and output passages terminate and the front surface portion therebetween, said diaphragm being connected to said valve body along the periphery of said diaphragm in fluid tight relation, and an angularly displaceable cylindrical roller movably engaging an area of said diaphragm and pressing said diaphragm into engagement with said front surface along different angular paths to alter the magnitude of a flow of fluid passing from said input passage to said output passage.

5. Valve means for controlling fluid flow, comprising a valve body having a single flat front surface, said valve body being provided with an input and an output passage both extending to said front surface, a resilient diaphragm overlying a poriton of said front surface including the portions thereof at which said input and output passages terminate and the front surface portion therebetween, said diaphragm being connected to said valve body along the periphery of said diaphragm in fluid tight relation, and an angularly displaceable movable member having a curved surface portion movably engaging an area of said diaphragm and pressing said diaphragm into engagement with said front surface along different angular paths to alter the magnitude of a flow of fluid passing from said input passage to said output passage.

6. Valve means for controlling the flow of gaseous fluids, comprising a valve body having a single flat front surface, said valve body being provided with an input passage and an output passage spaced therefrom, both said passages terminating at said front surface, a resilient diaphragm overlying said front surface and being connected to said front surface along the peripheral edge of said diaphragm in fluid tight relation therewith, roller means movably engaging an area of said diaphragm, means for biasing said roller means and valve body toward one another whereby to cause said roller means to press said diaphragm into fluid tight relation with said fron surface, and a handle connected to said roller means for angularly displacing said roller means on said diaphragm to thereby change the area of engagement between said diaphragm and said front surface along different angular paths to alter the magnitude of a flow of gas passing between said input and output passages.

7. Valve means for controlling the flow of gaseous fluids, comprising a valve body having a single flat front surface, said valve body being provided with an input passage and an output passage spaced therefrom, both said passages terminating at said front surface, a resilient diaphragm overlying said front surface and being connected to said front surface along the peripheral edge of said diaphragm in fluid tight relation therewith, a cylindrical rollers movably engaging an area of said diaphragm, means for biasing said cylindrical roller and valve body toward one another whereby to cause said cylindrical roller to press an area of said diaphragm into fluid tight relation with said front surface, and a handle connected to said cylindrical roller for angularly displacing said cylindrical roller on said diaphragm to thereby change the area of engagement between said diaphragm and said front surface along different angular paths to alter the magnitude of a flow of gas passing between said input and output passages.

8. Valve means for controlling the flow of gaseous fluids, comprising a valve body having a single flat front surface, said valve body being provided with an input passage and an output passage spaced therefrom, both said passages terminating at said front surface, a resilient diaphragm overlying said front surface and being connected to said front surface along the peripheral edge of said diaphragm in fluid tight relation therewith, a member having a curved surface portion movably engaging said diaphragm, means for biasing said member and valve body toward one another whereby to cause said member to press said diaphragm into fluid tight relation with said front surface, and a handle connected to said member for angularly displacing said member on said diaphragm to thereby change the area of engagement between said diaphragm and said front surface along different angular paths to alter the magnitude of a flow of gas passing between said input and output passages.

9. Valve means for controlling the flow of gaseous fluids, comprising a valve body having a front surface, said valve body being provided with an input passage and an output passage spaced therefrom, both said passages terminating at said front surface, a resilient diaphragm overlying said front surface and being connected to said front surface along the peripheral edge of said diaphragm in fluid tight relation therewith, a cylindrical roller movably engaging said diaphragm, means for biasing said cylindrical roller and valve body toward one another whereby to cause said cylindrical roller to press said diaphragm into fluid tight relation with said front surface, and means for moving said cylindrical roller to thereby change the area of engagement between said diaphragm and said front surface to thus control the flow of gas between said input and output passages, the end of one of said passages at said front surface being tapered toward the other of said passages, whereby to provide for gradual control of gaseous flow between said passages.

10. Valve means for controlling the flow of gaseous fluids, comprising a valve body having a substantially rectangular front surface, said valve body being provided with an input passage and an output passage spaced therefrom, both said passages terminating at said front surface, the ends of said passages terminating at said front surface being aligned substantially parallel to two sides of said valve body, a resilient diaphrgam overlying said front surface and being connected to said front surface along the peripheral edge of said diaphragm in fluid tight relation therewith, a roller having its axis of rotation disposed transversely to said two sides of said valve body and extending entirely across said valve body, said roller being in rolling engagement with said diaphragm, spring means operatively engaging said roller and biasing said roller toward said valve body to press said diaphragm into fluid tight relation with said front surface, and means for moving said roller to thereby change the area of engagement between said diaphragm and said front surface to thus control the flow of gas between said input and output passages.

11. A valve for controlling the flow of a gas, comprising a valve body having a substantially rectangular front surface, said valve body being provided with first and second spaced input passages and first and second spaced output passages, said first input and output passages and said second input and output passages being aligned substantially parallel to two sides of said valve body, said first and second input passages and said first and second output passages being aligned substantially parallel to the other two sides of said valve body, a resilient diaphragm overlying said front surface and being connected to said front surface along the peripheral edge of said diaphragm in fluid tight relation therewith, a resilient partition extending between said other two sides of said valve body and being disposed between said first and second input passages and between said first and second output passages and being in sealed relation with said front surface and said diaphragm, roller means movably engaging said diaphragm, means for biasing said roller means and valve body toward one another whereby to cause said roller means to press said diaphragm into fluid tight relation with said front surface, and means for moving said roller means to thereby change the area of engagement between said diaphragm and said front surface to thus control the flow of gas between said first input and output passages and between said second input and output passages.

12. Valve means for controlling the flow of gaseous fluids, comprising a valve body having a front surface, said valve body being provided with an input passage, an exhaust passage and an output passage disposed therebetween, a resilient diaphragm overlying said front surface and being connected to said front surface along the peripheral edge of said diaphragm in fluid tight relation therewith, a movable member having a curved surface portion in engagement with said diaphragm, a rod having one end fixed to said member and extending outwardly therefrom, the other end of said rod being free, a spring operatively engaging said member to bias said member toward said valve body whereby to press a portion of said diaphragm into sealed relation with said front surface of said valve body, movement of the other end of said rod being effective to impart rolling movement to said member to thereby shift the area of engagement between the diaphragm and the front surface of the valve body, whereby to control the flow of gaseous fluid through said passages.

13. Valve means for controlling fluid flow, comprising a rigid member having a single flat front surface, a deformable resilient member overlying a portion of said front surface and its edges being in sealed relation with said rigid member to form therewith a resiliently deformable chamber, said rigid member having at least two spaced passages extending therethrough into said deformable chamber, and an angularly displaceable movable means for deforming an area of said chamber along different angular paths to alter the magnitude of a flow of fluid passing between said passages.

14. Valve means for controlling fluid flow, comprising a rigid member having a single flat front surface, a deformable resilient member overlying a portion of said front surface and its edges being in sealed relation with said rigid member to form therewith a resiliently deformable chamber, a movable means to deform said chamber, and said movable means being operably connected by a biasing member to a stationary member to enable said means to restrict the flow of a fluid from passing between at least two passages in said front surface when said means is in an overlap position wherein said member is being moved along said surface of said diaphragm a predetermined distance in one angular direction and said movable means being operably positioned in another angular underlap position to permit the flow of a fluid to pass between said passages as said means is moved along said surface of said diaphragm.

15. Valve means for controlling fluid flow, comprising a rigid member having a front surface and passages therein, a deformable resilient member overlying a portion of said front surface and its edges being in sealed relation with said rigid member to form therewith a resiliently deformable chamber, a movable means to deform said chamber, said movable means being operably connected by a biasing member to a stationary member to enable said means to restrict the flow of fluid from passing between said passages when said means is moved along said surface of said diaphragm and a means connected to said movable means to manually position said movable means in either an overlap or underlap valve position.

16. Valve means for controlling fluid flow, comprising a rigid member having a front surface and passages therein, a deformable resilient member overlying a portion of said front surface and its edges being in sealed relation with said rigid member to form therewith a resiliently deformable chamber, a movable means to deform said chamber, and said movable means being operably connected by a biasing member to a stationary member to enable said means to restrict the flow of fluid from passing between said passages when said means is moved along said surface of said diaphragm and a means for manually rotating said movable means with respect to said stationary member to move said valve into either an overlap or underlap position.

References Cited in the file of this patent
UNITED STATES PATENTS

| | | |
|---|---|---|
| 261,483 | Richardson | July 18, 1882 |
| 721,562 | Hibbard | Feb. 24, 1903 |
| 929,367 | Andersson | July 27, 1909 |
| 2,180,173 | Share | Nov. 14, 1939 |

FOREIGN PATENTS

| | | |
|---|---|---|
| 963 | Great Britain | May 2, 1854 |
| 809,500 | Germany | July 8, 1949 |